United States Patent [19]

Fuji et al.

[11] Patent Number: 4,786,851
[45] Date of Patent: Nov. 22, 1988

[54] BATTERY CHARGER

[75] Inventors: Sadao Fuji, Kobe; Takeharu Yamawaki, Otsu; Osamu Takamatsu, Ibaragi; Shinji Kuwamura, Takasago; Kazuhiro Suenobu, Otsu; Hiroshi Nakano, Ashiya, all of Japan

[73] Assignee: Kanegafuchi Kagaku Kogyo Kabushiki Kaisha, Osaka, Japan

[21] Appl. No.: 90,367

[22] Filed: Aug. 28, 1987

[30] Foreign Application Priority Data

Mar. 4, 1987 [JP] Japan ............................ 62-31726[U]

[51] Int. Cl.⁴ .................... H02J 7/00; H01L 31/04; H01M 10/44
[52] U.S. Cl. ................................ 320/2; 136/291; 136/293; 320/61; 320/48; 357/30
[58] Field of Search ............... 136/291, 293; 357/30 J, 357/71 R; 320/2, 61, 48

[56] References Cited

U.S. PATENT DOCUMENTS

| | | | |
|---|---|---|---|
| 4,109,193 | 8/1978 | Schultheis | 320/2 |
| 4,209,346 | 6/1980 | King | 320/2 X |
| 4,366,336 | 12/1982 | Donaghey | 357/30 J X |
| 4,571,448 | 2/1986 | Barnett | 357/30 J X |
| 4,665,278 | 5/1987 | Takada et al. | 357/71 R |

FOREIGN PATENT DOCUMENTS 61-13132 1/1986 Japan .
61-24962 2/1986 Japan .

OTHER PUBLICATIONS

"Battery Charger uses Solar Power" *Electronics,* Feb. 21, 1974.

*Primary Examiner*—R. J. Hickey
*Attorney, Agent, or Firm*—Lowe, Price, LeBlanc, Becker & Shur

[57] ABSTRACT

This invention relates to a battery charger which supplementally charges a secondary battery such as a battery and so forth in an automobile with use of a solar cell in which a diffusion-blocking layer is formed between a semiconductor and a reverse electrode for the purpose of preventing deterioration of a semiconductor layer, and in which electric potential of the secondary battery can be measured and displayed, and in which the solar cell can be securely provided in a compartment of an automobile in such a manner that the solar cell always faces sunbeams, and which can be freely attached and detached.

11 Claims, 5 Drawing Sheets

BATTERY CHARGER

TECHNICAL FIELD

This invention relates to a supplementary battery charger utilizing a solar cell which is capable of charging the battery of an automobile, which automobile battery is described hereafter as a secondary battery.

BACKGROUND ART

Great interest has recently developed in supplementary methods of charging the battery of an automobile which can be efficiently carried out with a battery charger. This battery charger incorporates a solar cell accommodated in the body of a case in a manner such that one surface of the solar cell is located in an opening formed in one surface of the case body. In addition, one end of a cable is electrically connected to the solar cell. The other end of the cable is provided with a plug which can be connected to a cigarette lighter socket located in the dashboard of an automobile.

In this battery charger the electric potential of the secondary battery is higher than that of one solar cell. Because of this a multiplicity of solar cells need to be connected in series to produce sufficiently large voltage. However, the manufacturing costs are extremely high when monocrystal type or polycrystal type solar cells are used.

Production costs can be reduced when an amorphous silicon solar cell is employed. However, in this case the weatherability and heat-resistance of the battery charger are not sufficient. The reason for this is that the place where the battery charger is positioned, such as the top surface of the dashboard of an automobile, becomes very hot at certain times of the year, for example during the summer. Metallic components which form the reverse electrode of an amorphous solar cell are in the presence of heat, prone to diffuse into a semiconductor layer. This leads to the deterioration of the semiconductor layer.

Another type of battery charger is known in which the secondary battery is supplementarily charged with solar cell. In this case, the electric potential of the secondary battery is displayed, as shown in FIG. 11, and the solar cell a is connected to an anode of the secondary battery d through an LED b and an inversion preventing diode c.

The only object of such a battery charger is to charge the secondary battery, and the LED b can therefore display the state in which the secondary battery d is being charged. However, the electric potential of the secondary battery d can neither be measured nor displayed. This results in the LED b being lit up and the secondary battery d being charged by means of the solar cell a, and the capacity of the secondary battery being almost empty. The supplemental charging performed by the solar cell cannot compensate for this and why the secondary battery cannot be used is not clearly understood.

Further, such a battery charger completely lacks a fastening member for securing it to an automobile. Instead, a very well known method of securing the battery charger to an automobile is to provide a hook, this hook is itself secured to a sucker which is adapted to be secured to the windshield of an automobile. Alternatively, a double-sided tape is sometimes employed for the purpose of securing the battery charger to an automobile.

The solar cell side of the charger needs to face upward when placed on the top surface of the dashboard of an automobile so that it may efficiently be exposed to the sun. However, when the battery charger completely lacks a fastening member, the battery charger often moves or falls as a consequence of sudden movements of the vehicle, e.g., when starting or stopping or some other form of shock occurring during driving. Accordingly, the solar cell cannot always be maintained facing the sun.

In addition, other problems arise when the battery charger is secured to a hook fixed to a sucker which is, in turn, secured to a windshield. In this case, the battery charger moves or swings with respect to the hook when any impact or vibration is experienced during the movement of the automobile. Thus, the solar battery cannot always face the sun, plus there is a risk of cable breakage.

Further, when double-sided tape is used for fastening the charger, attachment and detachment thereof cannot be carried out freely, so shifting of the solar battery in an automobile when this is necessary during parking is difficult. The tape may also cause damage to the surface of the automobile to which it is attached.

DISCLOSURE OF THE INVENTION

This invention relates to a battery charger for an automobile which is provided in the compartment of the automobile. This charger is capable of charging a battery even while the car is parked. Furthermore, any potential deterioration of the performance of a solar cell can be prevented even at high temperatures, e.g., in the summertime. Thus, the useful life of the charger is lengthened.

The present invention provides a battery charger for an automobile in which a solar cell and a battery checker are formed integrally. The solar cell supplementally charges the secondary battery in accordance with the amount of discharge from the secondary battery. Also, the electric potential is displayed in this charger.

The present invention also relates to a battery charger which can be provided securely and stably in the compartment of an automobile with the solar cell thereof always facing the sun. The charger can be attached to and detached from an automobile and can therefore be easily carried out therefrom.

BEST MODE FOR CARRYING OUT THE INVENTION

The embodiment of the battery charger according to the present invention will now be described referring to the accompanying drawings.

Figure 1:
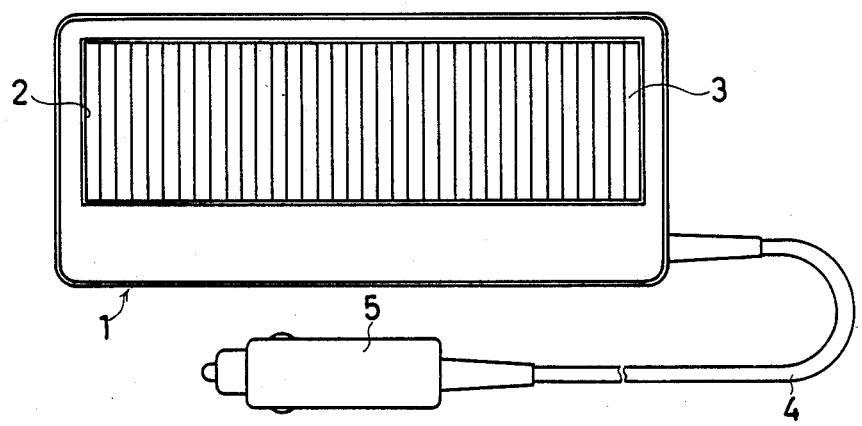
FIG. 1 is a planar view illustrating a first embodiment of a battery charger according to the present invention.

FIG. 1 is a planar view illustrating one embodiment of a battery charger according to the present invention.

Reference numeral 1 in this drawing represents a hollow case having an opening 2 on the top surface. In this case, the case 1 is made from an insulating synthetic resin and the like. The material of the case is not specifically limited to the stated example.

Reference numeral 3 represents a solar cell which is accommodated in the hollow in the aforementioned case 1. This solar cell 3 is connected to a terminal 5 through a wiring material made of an electrically conductive material.

Figure 2:
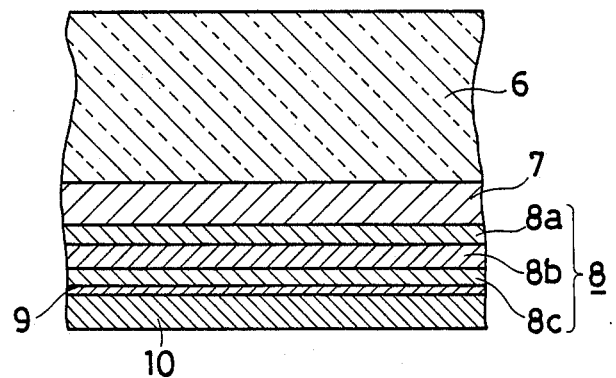
FIG. 2 is a cross sectional view of a solar cell which is used in the first embodiment of the battery charger according to the present invention.

FIG. 2 is a cross-sectional view illustrating an embodiment of the solar cell which is used in this invention. Reference numeral 6 represents a glass base body which serves as a substrate, and which is provided on the light incident side of the charger. Reference numeral 7 represents a transparent conductive film which can be made from indium-tin oxide (to be described is ITO hereinafter) or tin dioxide (to be described as $SnO_2$ hereinafter). Reference numeral 8 represents a solar cell, reference number 9 represents a diffusion-blocking layer, and reference numeral 10 represents a reverse side electrode made from metal such as aluminum and the like.

The solar battery cell 8 is an amorphous solar cell which is formed in a PIN junction manner consisting of a p-type amorphous silicon carbide 8a, i-type amorphous silicon 8b and n-type amorphous silicon 8c. The p-type layer on the light incident side is made from amorphous silicon carbide in order to improve the energy conversion efficiency even if the charger is placed in a heated environment.

The diffusion-blocking layer 9 is formed by depositing a metallic silicide layer or by heating and the like the metallic element which has been provided to form the silicide layer. In the metallic element, chrome, nickel, or titanium and the like are employed. Chrome is employed in the embodiment described herein.

A superstrate type solar cell of a glass base body 6 is provided on the light incident side of the solar cell 8 so as to serve as a supporting body. However, a substrate type solar cell in which the supporting body is made from a synthetic resin, glass, metal and the like and secured to the side in which reverse electrode 10 is provided may be, of course, employed as well. As mentioned above, the battery charger of an automobile according to the present invention has such a solar cell accommodated in the hollow of the case 1 shown in FIG. 1. The solar cell is connected to the terminal 5 through the wiring material 4.

According to the present invention, a battery charger for an automobile is provided which can charge a battery even when the automobile is parked. This is effected by placing the battery charger on the dashboard of the automobile in contact with sunbeam irradiation, and by inserting the terminal 5 into a cigarette lighter socket in the automobile. Furthermore, the battery charger for an automobile of this invention displays a heat-aging resistance which is 100 time that of a conventional type. this can be provided because the diffusion-blocking layer 9 decreases the diffusion of any metallic component of the reverse electrode 10 into a semiconductor layer. In this manner, it prevents the aging of the amorphous silicon solar cell 8 from the high temperatures which occur in the compartment inside of the automobile during the summer. In addition, costs are also reduced by utilizing an amorphous silicon solar cell as the solar cell of the charger of this invention. MOreover, high energy conversion efficiency can also be obtained because the amorphous silicon carbide 8a is employed on the light incident side.

A transparent conductive film made of ITO of $SnO_2$, which is the same as the transparent conductive film 7, can be used as the diffusion-blocking layer 9. However, in this case the efficiency of preventing the diffusion of the metal is inferior to that afforded when metallic silicide is provided.

Figure 3:
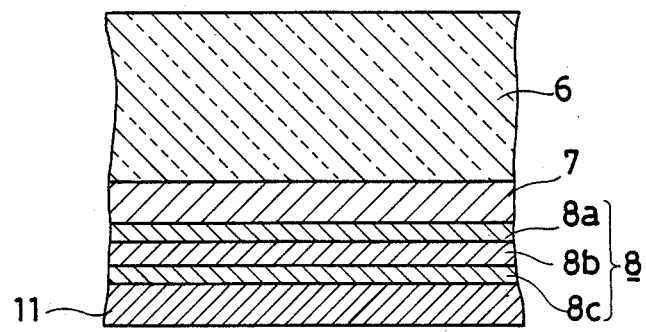
FIG. 3 is a cross sectional view for explaining an example of the solar cell which is used in the first embodiment of the battery charger according to the present invention.

FIG. 3 is a cross sectional view illustrating another embodiment of the solar cell which is used in the battery charger of an automobile according to the present invention.

The transparent conductive film 7 and the solar cell 8 are the same as in the aforementioned embodiment. However, the diffusion-blocking layer is omitted here, and an alloy having substantially 0.1 to 20 atomic % Ag, Cu, Cr, Ni or the like is employed as the reverse electrode 11. This reverse electrode 11 also serves as a diffusion-blocking layer.

By way of composing the battery charger for an automobile with the aforementioned solar cell, the diffusion of the metallic component into the semiconductor layer can be prevented even without providing a diffusion-blocking layer. In this manner the aging of the amorphous silicon solar cell can be prevented.

The effect of preventing the diffusion of the metal is small in comparison to the case where a metallic silicide layer such as chrome silicide or the like is employed as the diffusion-blocking layer 9. However, the number of manufacturing processes is, of course, reduced. And furthermore, the energy conversion efficiency is equivalent to the case in which metal silicide is used.

In the battery charger according to the present invention in which the aforementioned solar cell is employed, a diffusion-blocking layer is formed between the solar cell and the reverse electrode. In this manner, the diffusion of the metal components of the reverse electrode into the semiconductor layer can be prevented even if the inexpensive amorphous silicon solar cell is employed. As a result of this, a potential deterioration of the performance of the battery charger can be prevented even if it is used in a heated compartment of an automobile during the summer season. A long-life, inexpensive battery charger can thus be provided in accordance with this invention.

Figure 4:
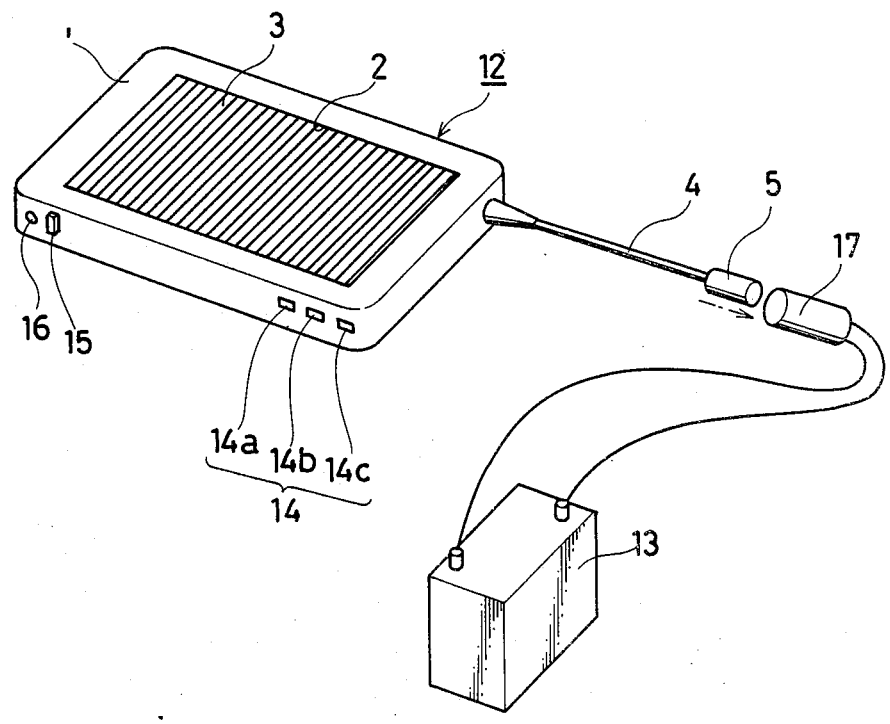
FIG. 4 is a perspective view illustrating a second embodiment of the battery charger according to the present invention which is connected to a secondary battery.

FIG. 4 is a perspective view illustrating the battery charger of the second embodiment of this invention and its connection to a secondary battery.

Reference numeral 3 represents a solar cell which serves as a power source to supplementally charge the secondary battery 13. The supplemental solar cell 3 is accommodated by the case 1 in such a manner that the surface thereof is located in the opening 2 of the case 1. A photoelectric transfer element such as amorphous silicon, polycrystal silicon, silicon monocrystal or the like is employed here. However, preferably, a photoelectric transfer element of an amorphous semiconductor may also be employed. In this element, a transparent conductive film is employed, such as a metal silicide layer employing a metallic element such as chrome, nickel or titanium. This film is provided between the semiconductor and the reverse electrode. A transparent conductive film such as indium-tin oxide, to be described as ITO hereinafter, or tin dioxide, to be described as $SnO_2$ hereinafter, can also be formed. This type of film is of a heat insulating type.

Reference numeral 14 represents a display device consisting of three LEDs: 14a, 14b and 14c.

The LEDs 14a, 14b and 14c display the potential of the secondary battery 13 in sequence from high level, intermediate level to low level. The LEDs are provided adjacent to the right end of the front surface of the case 1. However, the position thereof on the case 1 can be determined optionally without any restriction. The number of LEDs is not especially restricted so as to correspond to the case where the potential of the secondary battery 13 is measured in the manner of more small units. However, since LEDs necessitate the most electricity in the device, the number thereof is necessarily determined by the capacity of the solar cell 3.

In this embodiment, the display device 14 the measured potential is displayed in sequence in an analog manner. Alternatively, the measured potential may also be displayed in a digital manner.

Although when crystal, to be described as LCD hereinafter, is employed as the display device 14, it can reduce the electric current required for displaying, the brightness displayed thereof is inferior to that of an LED. Therefore the displaying method is a choice to be made in each case.

Reference numeral 15 represents a mono-electrode switch which acts to separate the secondary battery 13 from the battery charger 12. This mono-electrode is provided at any suitable position on the case 1.

Reference numeral 16 represents an LED which is turned on for the purpose of displaying while the secondary battery 13 is charged by the solar cell 3.

Reference numeral 5 represents a terminal which is designed to be inserted into a cigarette socket 17 of an automobile. In this fashion, the battery of an automobile can be very easily charged.

Figure 5:
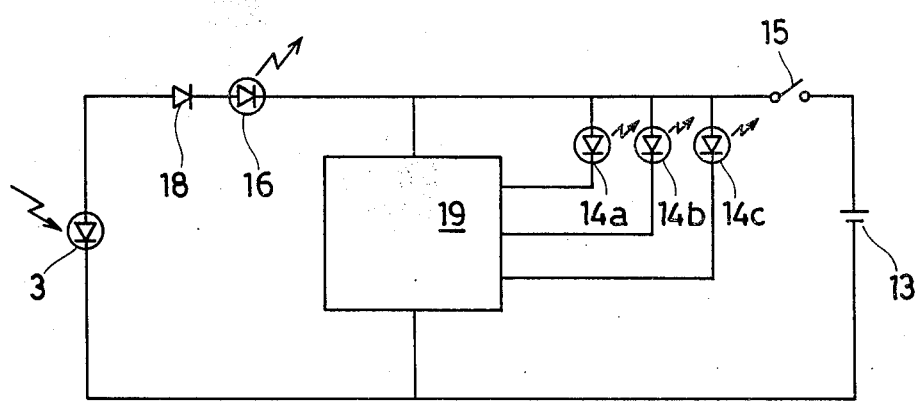
FIG. 5 is a circuit diagram of the second embodiment of the battery charger according to the present invention.

The manner in which the secondary battery 13 is charged by the battery charger, the structure of which is mentioned above, and how to display the potential will now be described with reference to the structure of the circuit shown in FIG. 5.

The secondary battery 13 and the solar cell 3 are connected as an anode of the solar cell 3 and that of the secondary battery 13 are connected through an inversion preventing diode 18 and LED 16 and the switch 15.

The LED 16 is lighted and the solar cell 3 shows a potential higher than that of the secondary battery 13 when the secondary battery 13 is being charged by the solar cell 3. The inverse state, that is, when the potential of the secondary battery 13 is higher than that of the solar cell 3, the inversion preventing diode 18 protects the solar cell 3 by stopping the electric current.

Furthermore, the potential of the solar cell 3 can be determined when the switch 15 is turned off. The state of the solar cell can be checked as well.

Reference number al 19 represents a comparison circuit in which a potential is provided to be divided into three steps as low potential, intermediate potential and high potential. This is attained with elements such as a semiconductor or the like used as illustrated. This permits a comparison of the potential of the secondary battery 13 with each one of the provided potential. When the potential of the secondary battery 13 corresponds to either one of the potentials provided, the part of the potential to which it corresponds is made into the output.

According to the aforementioned embodiment, a longer life can be obtained with the invention when compared with a device employing a voltmeter. This is attained with the aid of the LED employed. Furthermore, the state of the secondary battery 13 can be easily determined because the potential of the secondary battery 13 can be displayed in a graduated manner by means of the comparison circuit 19. And because the LED 14 is a luminous LED, the state of the secondary battery 13 can be easily checked even during the dark of the night.

Further, the state of the solar cell 3 can be checked by way of separating the battery charger 12 from the secondary battery 13 by means of switch 15. Any problems caused from the defects of the solar cell can thus be prevented.

Figure 6:
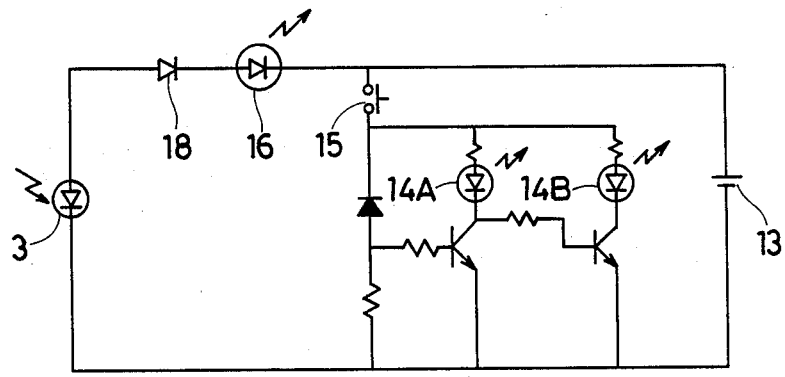
FIG. 6 is another example of the circuit diagram of the second embodiment of the battery charger according to the present invention.
Figure 11:
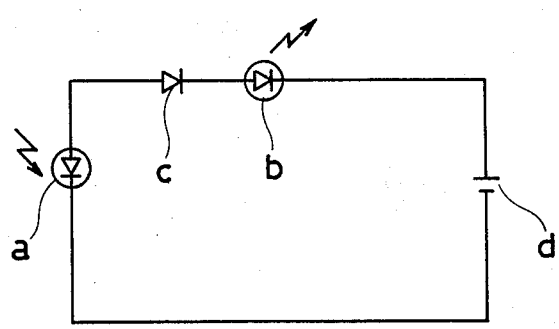
FIG. 11 is a simplified circuit diagram of a conventional example.

FIG. 6 is a circuit diagram of another example of the second embodiment of the battery charger according to the present invention. In this circuit, the comparison circuit 19 shown in FIG. 5 is alternatively formed by a transistor, a Zener diode and a resistor.

In this circuit, as illustrated, the secondary battery 13 and the solar cell 3 are connected in parallel to the switch 15, and the two LEDs display the potential of the secondary battery 13 in such a manner that LED 14A displays the high potential, the LED 14B displays the low potential and the lighting of both, LEDs 14A and 14B, displays the intermediate potential.

According to this circuit, the number of parts required for the circuit can be reduced, and the number of LEDs can be made small as well. The costs can therefore be reduced. Further, the space required for placing the circuit can also be reduced.

Furthermore, the comparison circuit 19 can be separated from the solar cell 3 or from the secondary battery 13 by means of the switch 15. The electric consumption in the secondary battery can be greatly reduced by turning on the switch 15 only when the potential of the secondary battery is intended to be ascertained.

According to such a battery charger, the problem of potential discharge of the secondary battery when an automobile or the like is left standing for a long time can be greatly reduced as the secondary battery 13 is being charged by the solar cell 3.

Furthermore, the state of the potential of the secondary battery 13 can be checked in the manner described above.

Various types of display devices are employed as the display device 14 to display in an analog or digital manner, namely voltmeters, LEDs, LCDs, fluorescent display tubes or the like. However, employing an LED contributes to the compactness of the device and it can be furthermore discerned even at night.

Figure 7:
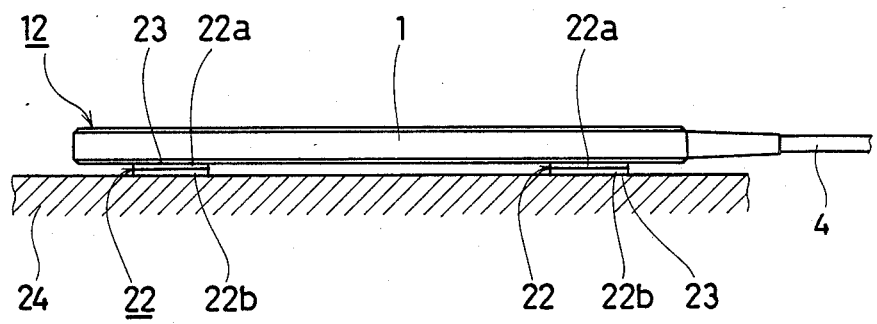
FIG. 7 is a front view of a third embodiment of the battery charger according to the present invention.
Figure 8:
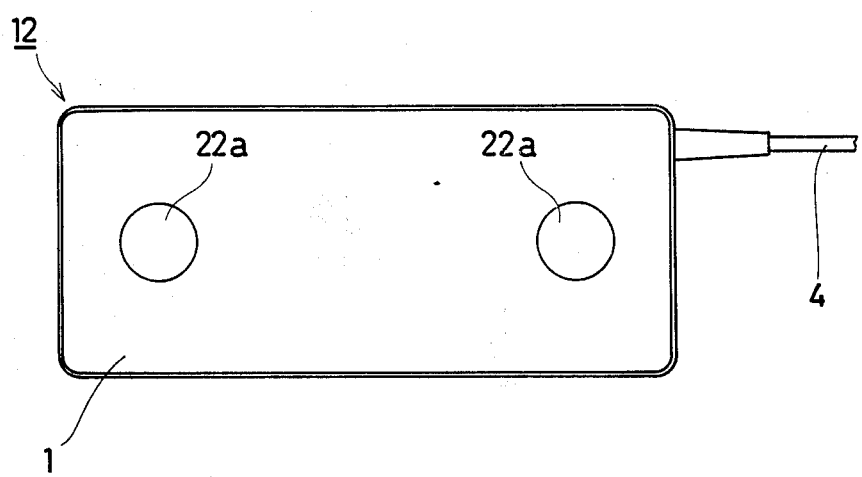
FIG. 8 is a bottom view of the third embodiment of the battery charger according to the present invention.
Figure 9:
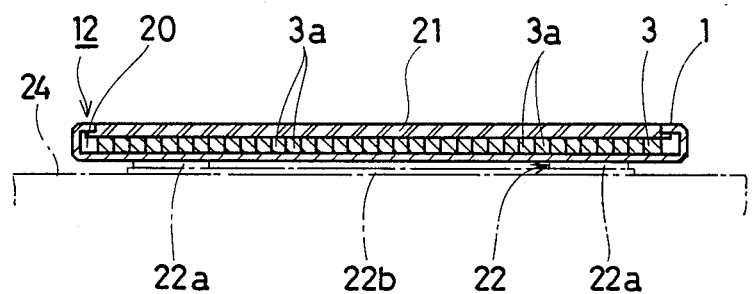
FIG. 9 is a vertical cross-sectional view of the third embodiment of the battery charger according to the present invention.

FIGS. 7 to 9 are views of a third embodiment of the battery charger according to the present invention.

The planar view of this third embodiment is the same as that of the first embodiment shown in FIG. 1. An opening 2 is formed in one surface of the case 1 having a hollow portion 20 therein. The case is made of heat insulated synthetic resin. The solar cell 3 is provided in the aforementioned hollow portion 20 so that the surface thereof is located in the opening 2. The surface of the solar cell 3 is provided with a transparent plate body 21 having insulating capacity which is made of glass or a synthetic resin.

A through hole (omitted from the illustration) is formed on the side surface of the case 1. One end of a wiring material 4 penetrates into the hole and then the wire is electrically connected to the solar cell 3. The other end of the wire is provided with the terminal 5 which is capable of being connected to the cigarette socket provided in the dashboard of a car.

The solar cell 3 is formed so that a plurality of unit-cells 3a are connected in series to increase the total electromotive force.

A planar fastener 22 having on one side a fastening portion 23, for example, and on the other side a male portion 22a, is stuck with an adhesive or a two-sided tape as illustrated, to the reverse side of the case 1 which accommodates the solar cell 3.

In order to make the solar cell 3 of the case 1 face the sunbeams after installation has been completed, a female portion 22b is provided on the other side of the planar fastener 22. The female portion 22b has a size and is positioned so as to correspond to the male portion 22a of the planar fastener 22 which is provided on the reverse side of the case 1. This is fastened as at 23, to a suitable portion of the automobile, such as the dashboard surface 24. By fastening the male portion 22a and female portion 22b of the aforesaid planar fastener, the case 1 containing the solar cell 3 is secured to the top surface of the dashboard 24 of an automobile. After fastening is completed, the battery charger 12 according to the present invention is constructed and positioned to function.

The female portion 22b of the planar fastener 22 which is secured on the top surface of the dashboard 24 is not limited only to the portion corresponding to the male portion 22a of the planar fastener 22 on the reverse side of the case 1. The female portion 22b of the fastener may be secured to a larger area which includes the aforesaid portion.

The case 1 can thus be shifted at will to make the solar cell 3, which is accommodated in the case 1, securely face toward the sunbeams as time passes and the automobile moves. As a result of the arrangement provided by the present invention a great improvement in the efficiency to charge the secondary battery provided for the automobile is attained.

A pile fabric may be employed in the female portion 22b of the plane fastener 22.

Figure 10:
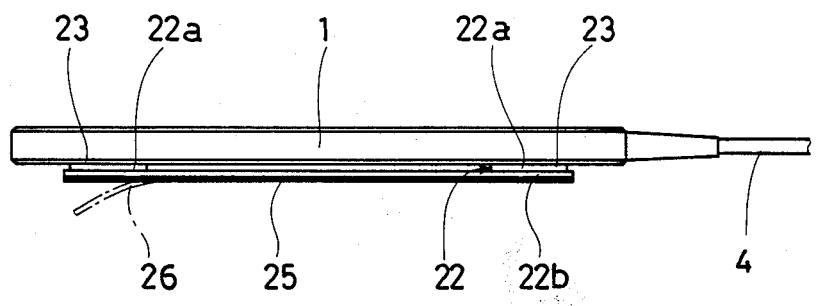
FIG. 10 is a front view of a fourth embodiment of the battery charger according to the present invention.

A suitable cushion material 25 may be applied to the reverse side of the female portion 22b of the planar fastener 22 as in the fourth embodiment of the battery charger according to the present invention shown in FIG. 10. Reference numeral 26 represents a released paper which acts to protect the adhesive layer provided on the reverse side of the female portion 22b of the planar fastener 22. This release paper 26 is separated during installation of the device in a suitable place of the automobile so that the planar fastener 22b can be secured thereto.

Thanks to the aforesaid provision, the solar cell 1 or circuit which are accommodated in the case 1 are protected from breakage caused by shock when starting or stopping an automobile, or by shock or vibration during the operating of an automobile.

Furthermore, the male portion 22a of the planar fastener 22 may be secured onto the surface of the case 1 adjacent to the solar cell 3. The female portion 22b of the planar fastener 22 is secured to the side adjacent to the reverse side of the windshield glass of the automobile. Thus, the case 1 accommodating the solar cell 3 may be secured to the windshield of an automobile s another embodiment of the battery charger 12.

This battery charger 12 is arranged in a manner similar to that employed in the first and the second embodiments. The charger 12 is positioned so that the plug 5 is connected to the cigarette socket of an automobile, and sunlight is therefore converted into electric energy to charge the battery of an automobile as the secondary battery.

As an alternative to the plug 5, a cable may be employed to connect a fuse holder or a car body earth.

According to the third and fourth embodiments of the battery charger according to the present invention, the battery charger does not move from its position even as a consequence of shock caused by starting or stopping the automobile, or the shock or vibrations caused by the operation of the car. Thus, a battery charger in accordance with this invention can be stably and securely fastened to a portion of a car.

Furthermore, the case 1 accommodating the solar cell 3 is fastened onto the side of an automobile by means of the planar fastener 22. The attachment and detachment of the device can thus be very easily carried out, especially the shifting of the device to a place reached by sunbeam irradiation. This is very easily carried out in the compartment of an automobile, whereby charging by means of the solar cell can be very efficiently carried out even if an automobile is parked.

Further, the removal of the charger during periods of time when it is not needed such as at night and so forth can also be carried out. The present charger easily tolerates repeated attaching and detaching thereof.

The problems of damaging the surface of the automobile to which the charger is attached is not raised either.

We claim:

1. A battery charger for automobiles comprising
   a case made of thin plate having a surface and an opening on a portion of the surface top thereof and said case also having a hollow portion therein,
   a solar cell consisting of a tansparent electrode, an amorphous silicon semiconductor layer, a metal diffusion blocking layer and a reverse electrode, said solar cell being accommodated by said case in such a manner that a surface of the cell is located in said opening,
   a wiring material provided with a plug at one end thereof to couple said wiring material with a cigarette lighter socket and to take out an electromotive force of said solar cell,
   a circuit provided in said case for measuring an electric potential of a secondary battery being charged by said solar cell, and
   a display device displaying said electric potential of said secondary battery charged by said circuit.

2. The battery charger for automobiles according to claim 1, wherein
the case is rectangular and the surface thereof has a shorter-length side and a longer-length side.

3. The battery charger for automobiles according to claim 2, wherein
the wiring material is wired onto the shorter-length side surface of said case.

4. The battery charger for automobiles according to claim 2, wherein
the display device is provided on the longer-length side surface of said case.

5. The battery charger for automobiles according to claim 1, wherein
said display device consists essentially of 2 LEDs and can display an electric potential in three steps in response to a charge of the secondary battery, wherein each LED lights up separately or 2 LEDs light up at the same time.

6. The battery charger for automobiles according to claim 1, wherein
the metal diffusion-blocking layer comprises a metallic silicide layer.

7. The battery charger for automobiles according to claim 1, wherein
said metal diffusion-blocking layer comprises a transparent conductive layer made of a material selected from the group consisting of indium-tin oxide and tin dioxide.

8. The battey charger for automobiles according to claim 1, wherein
said reverse electrode and said metal diffusion-blocking layer comprise an aluminum alloy.

9. A battery charger for automobiles, comprising
a case made of thin plate having a surface and an opening provided on the top thereof, and said case also having a hollow portion therein,
a solar cell consisting at least of a transparent electrode, an amorphous silicon semiconductor layer and a reverse electrode, said solar cell being accommodated by said case in such a manner that a surface of the cell is located in said case opening,
a wiring material provided with a plug at one end thereof, said plug being projected to facilitate coupling of said wiring material with a cigarette lighter socket and to take out an electromotive force of said solar cell,
a circuit provided in said case for measuring an electric potential of a secondary battery being charged by said solar cell,
a display device provided on the surface of said case, said device for displaying said electric potential of said secondary battery measured by said circuit, and
a planar fastener secured onto a lower portion of the surface of said case.

10. The battery charger for automobiles according to claim 9, wherein said measuring circuit consists of
a first transistor which is provided with a collector side and a base to which measured voltage is supplied through a resistor,
a first LED connected to said collector side of said first transistor,
a second transistor provided with a collector side and a base to which is connected the base of the collector side of said first transistor, and
a second LED which is connected to the collector side of said second transistor.

11. A battery charger for automobiles comprising
a rectangular case made of thin plate, said case having a surface and shorter-length and longer-length sides, a hollow portion therein, wherein said surface is provided with an opening in a portion of the top thereof,
a solar cell provide with a surface and consisting of a transparent electrode, an amorphous silicon semiconductor layer, a metal diffusion-blocking layer and a reverse electrode, said solar cell having a surface and being accommodated by said case in a manner such that a portion of the surface thereof is located in said case opening,
a wiring material being wired onto the shorter-length side surface of said case and provided with a plug at the end thereof for coupling said wiring material with a cigarette lighter socket and to take out an electromotive force of said solar cell,
a circuit provided in said case for measuring an electric potential of a secondary battery being charged by said solar cell,
a display device provided on the longer-length said surface of said case, said device being provided for displaying said electric potential of said secondary battery measured by said circuit, and
a planar fastener secured onto a lower portion of the surface of said case.

* * * * *